May 22, 1956     R. V. LACKNER     2,747,068
INDUCTION HEATING APPARATUS
Filed Aug. 28, 1951     3 Sheets-Sheet 1

INVENTOR.
Robert V. Lackner
BY
HIS ATTORNEYS

May 22, 1956 R. V. LACKNER 2,747,068
INDUCTION HEATING APPARATUS
Filed Aug. 28, 1951 3 Sheets-Sheet 2

INVENTOR.
Robert V. Lackner
BY
Webb, Mackey & Burdon.
HIS ATTORNEYS

May 22, 1956  R. V. LACKNER  2,747,068
INDUCTION HEATING APPARATUS
Filed Aug. 28, 1951  3 Sheets-Sheet 3

INVENTOR.
Robert V. Lackner
BY Webb, Mackey & Burden
HIS ATTORNEYS

United States Patent Office 2,747,068
Patented May 22, 1956

2,747,068

INDUCTION HEATING APPARATUS

Robert V. Lackner, Pittsburgh, Pa.

Application August 28, 1951, Serial No. 244,018

8 Claims. (Cl. 219—10.75)

This invention relates to certain new and useful improvements in induction heating coils which may be operated by polyphase currents. It is equally applicable to both low frequency and high frequency work, but is particularly directed to low frequency induction heating coils.

Generally, low frequency induction heating is best adapted for deep penetration and through heating. Hence, it finds wide application in the rolling, forging, and extruding fields where uniform heating of the workpiece, together with close temperature control is necessary for quick and efficient production. Furthermore, a uniformly heated piece is relatively free from internal stresses and strains, and hence, results in a better finished product.

Low frequency induction heating coils have heretofore preferably been single phase coils because they produce uniform heating characteristics due to uniform flux density throughout the length of the inductor, and because close temperature tolerances can be maintained. However, since most power transmitted is three phase, power companies dislike, and in some cases, restrict the use of single phase power for low frequency induction heating because it results in unbalanced loading of their three phase power lines. Similar unbalanced loading will result where two phase power is supplied.

Two phase or three phase coils placed in endwise relation with each other have been used to give a balanced power loading, but this condition exists only when the workpiece is substantially the same length as the combined length of the two phase or three phase coils. Should the workpiece be less than the length of the coils, the power circuit loading will be unbalanced. Also due to zones of low magnetic field intensities between adjacent phases, the conventional two phase and three phase coils have uneven heating characteristics.

My invention has the advantages of single phase heating characteristics and close temperature control together with balanced polyphase power circuit loading. To enjoy these advantages, I employ an inductor formed from two coils extending side by side, and wound into coils which extend substantially the length of the inductor. Connected to each coil is one phase of a two phase power source.

Figure 1:
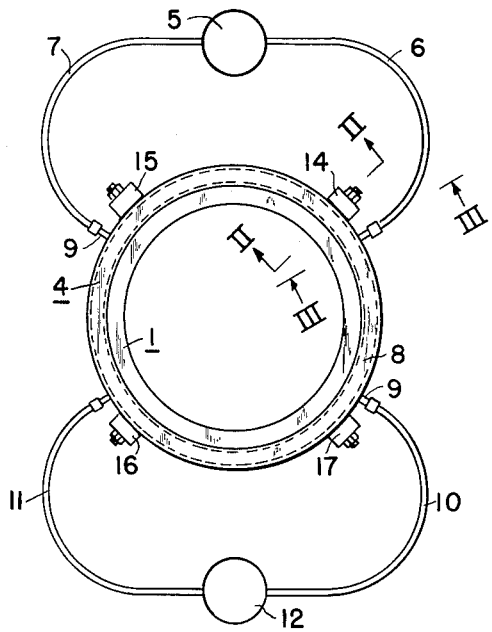
Figure 2:
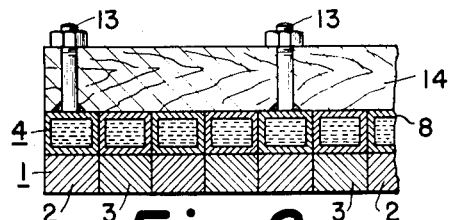
Figure 3:
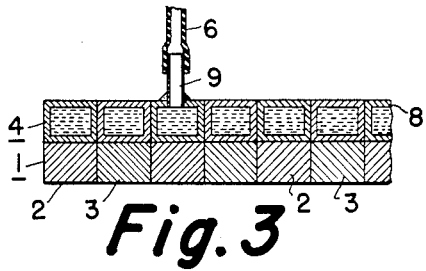
Figure 4:
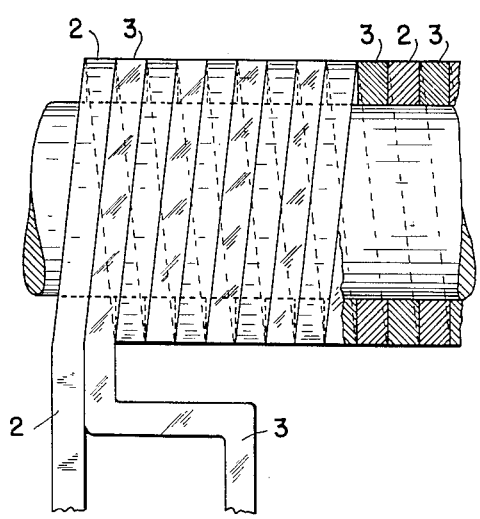
Figure 5:
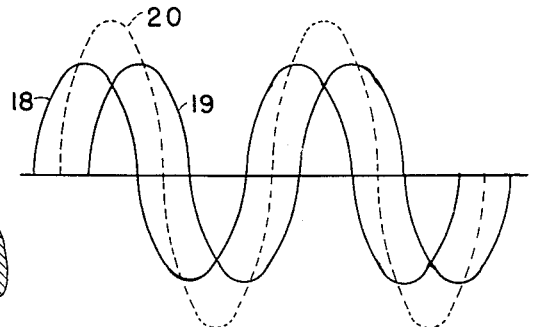
Figure 7:
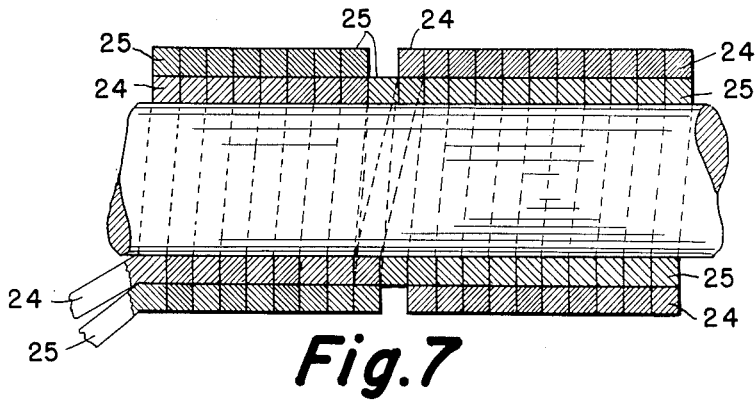
Figure 8:
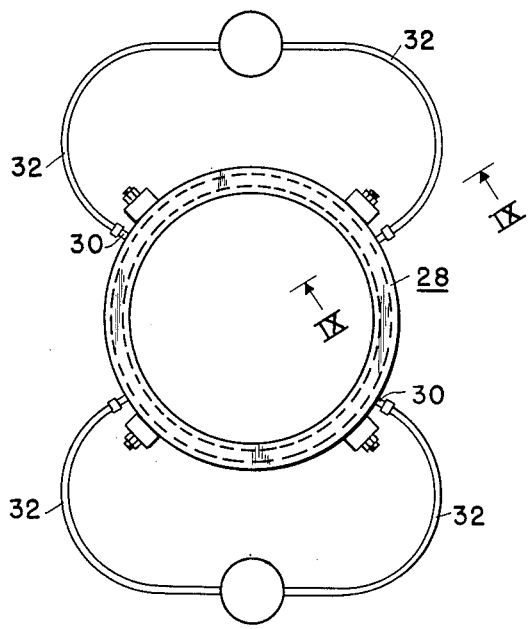
Figure 6:
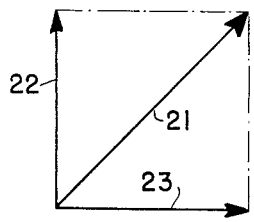
Figure 9:
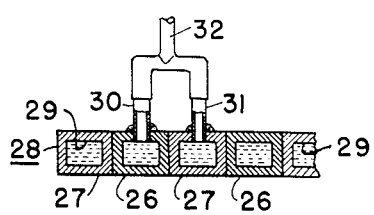
Figure 10:
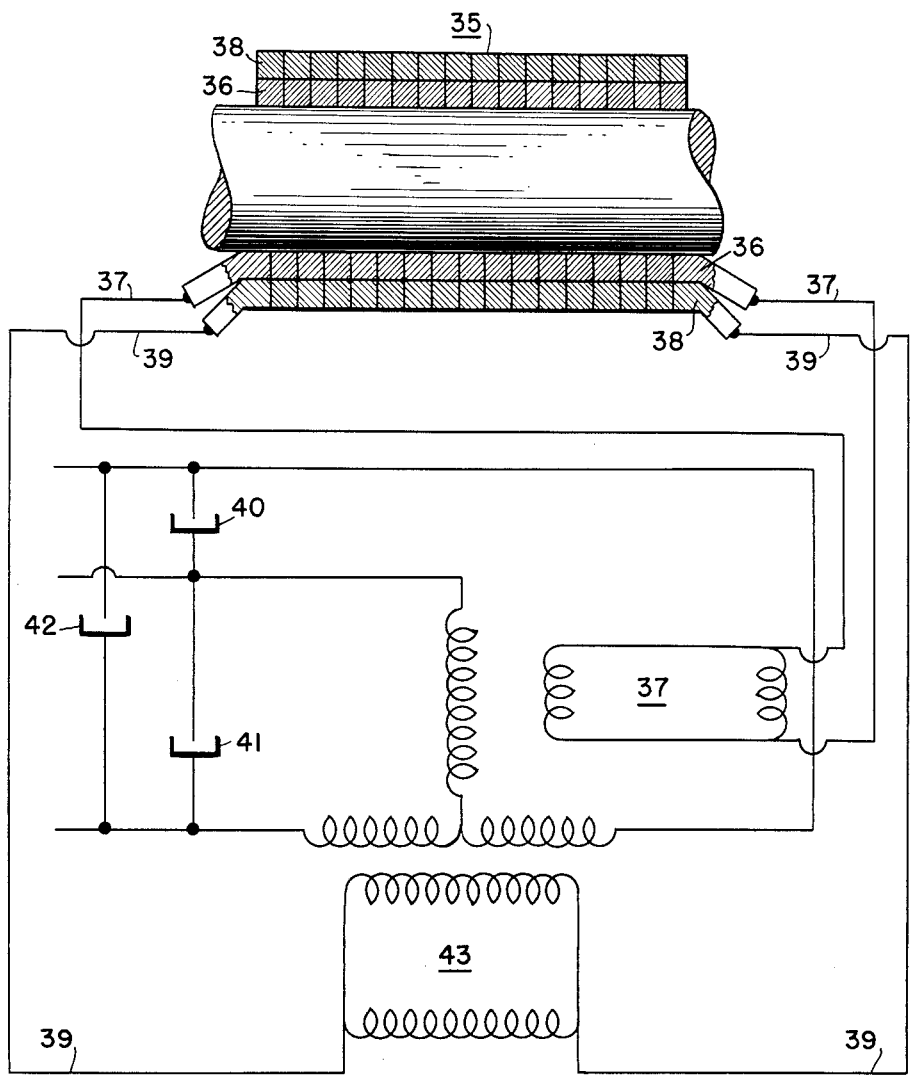

In the accompanying drawings I have described certain preferred embodiments of my invention in which Figure 1 is an end elevation view of one embodiment; Figure 2 is a section view along the line II—II in Figure 1; Figure 3 is a section view along the line III—III in Figure 1; Figure 4 is a side elevation view of the inductor shown in Figure 1; Figure 5 is a graphic representation of the relation between time and flux density of my invention; Figure 6 is a vector diagram showing the relation of the flux densities; Figure 7 is a side elevation view of a second type of an inductor; Figure 8 is an end elevation view of a third embodiment of my invention; Figure 9 is a section view along the line IX—IX in Figure 8; Figure 10 is a side elevation view of another embodiment of my invention.

As shown in Figures 1, 2, 3, and 4, my invention comprises an inductor 1 made from two co-axially wound coils 2 and 3, having equal radii and having their turns wound between one another. Each coil extends substantially the length of the inductor 1. A water circulating system 4 surrounds the coils 2 and 3. It has a header 5 connected by tubes 6 and 7 made from non-conducting material to a cooling coil 8 extending substantially the length of the inductor 1. As shown in Figure 3, tube 6 is connected to a nipple 9 which in turn, is joined to the cooling coil 8. Tubes 10 and 11, similarly made from non-conducting material, join the cooling coil 8 to an outlet 12. A conventional pump (not shown) circulates the water. The inductor 1 may be constructed without a cooling system.

Bolts 13 are brazed or welded to the cooling coil 8 and connect the inductor 1 and the cooling coil to turn bracing members 14, 15, 16, and 17, made of non-conducting material which members extend substantially the length of the inductor. These turn bracing members strengthen the apparatus and make it more suitable for heavy usage.

Connected to each of said coils 2 and 3 is one phase of a conventional two phase power source (not shown). Since most power transmitted is three phase, a Scott connection, a Taylor connection or any other similar transformer connection may be employed to transform three phase power into two phase power.

Figure 5 is a graph showing the relationship of the flux densities of each phase 18 and 19 of a two phase power source and the resultant flux density 20 in relation to time.

Figure 6 is a vector representation of the resultant flux density 21 of my invention. 22 and 23 are the flux densities of each of the two phases. Except for the very ends of the inductor 1, the flux density within the inductor is 1.414 times that of one phase.

In Figure 7 I show a second embodiment of my invention with one coil 24 connected to one phase of a two phase power source (not shown), which coil is wound substantially one-half the length of the inductor. The second coil 25, connected to the other phase is wound over coil 24 substantially one-half the length of the inductor. Then I reverse the coils with coil 24 being wound over coil 25, the second half of the length of the inductor. A cooling system for the coils similar to that shown in Figures 1, 2, and 3 can be added if needed.

In another embodiment of my invention, as shown in Figure 10, I construct an inductor 35 having one coil 36 connected to one phase 37 of a two-phase power source which coil is wound substantially the length of the inductor. The second coil 38 connected to the other phase 39 is wound over the first coil substantially the length of the inductor. In this construction I employ a conventional arrangement of capacitors 40, 41 and 42 on the three-phase side of a Scott transformer connection 43 with one capacitor across each phase of the three-phase power lines. This capacitor arrangement improves the power factor of the three-phase power lines. Likewise, this same capacitor arrangement on the primary side of a Taylor transformer connection improves the power factor.

Figures 8 and 9 illustrate another embodiment constructed similarly to the embodiment shown in Figures 1, 2, 3, and 4 except coils 26 and 27 of the inductor 28 carry both current and water for cooling them. Each coil has a bore 29 extending through its length through which water circulates. As shown in Figure 9 water inlet nipple 30 for coil 26 and water inlet nipple 31 for coil 27 insure that the water flowing through coils 26 and 27 is separated. The water outlets for the coils are similarly constructed. The tubing 32 connecting the water circulating system to the water inlets and outlets is of non-conducting material.

My invention has the advantages of the single phase coil, namely, uniform heating characteristics and close temperature control irrespective of the length of the workpieces. In addition, I have the same heating effect as a single phase coil since my flux density is 1.414 times that of a single phase.

Of great benefit to power companies or suppliers of power is the fact that I use polyphase power for induction heating without unbalancing the load on the power circuits. Furthermore, I maintain balanced power circuit loading regardless of the difference in length between the inductor and the workpiece.

With my invention I can furnish uniformly heated workpieces for rolling, forging, and extruding in both the ferrous and non-ferrous fields at close temperature tolerances. My invention can also be used in the petroleum industry to heat conduits to close temperature tolerances and thereby efficiently, easily and economically convey viscous products from one container to another.

While certain present preferred embodiments of the invention have been shown and described, it will be understood that it may be othtrwise embodied within the scope of the appended claims.

I claim:

1. An induction heating apparatus comprising a source of two phase power an inductor formed from two coils, one phase of said two phase power source being connected to one of said coils, the other phase of said two phase power source being connected to the other coil, said coils extending side by side and being wound together into coils which extend substantially the length of the inductor.

2. An induction heating apparatus comprising a source of two phase power an inductor formed from two coils, one phase of said two phase power source being connected to one of said coils, the other phase of said two phase power source being connected to the other coil, said coils extending side by side and being wound together into coils which extend substantially the length of the inductor and cooperating means for cooling said coils.

3. An induction heating apparatus comprising a source of two phase power an inductor formed from two co-axially wound coils, one phase of said two phase power source being connected to one of said coils; the other phase of said two phase power source being connected to the other coil, said coils extending side by side and being wound together into coils which extend substantially the length of the inductor.

4. An induction heating apparatus comprising a source of two phase power an inductor formed from two co-axially wound coils, one phase of said two phase power source being connected to one of said coils, the other phase of said two phase power source being connected to the other coil, said coils extending side by side and being wound together into coils which extend substantially the length of the inductor and cooperating means for cooling said coils.

5. An induction heating apparatus comprising a source of two phase power an inductor formed from two coils, one phase of said two phase power source being connected to one of said coils, the other phase of said two phase power source being connected to the other coil, said coils extending side by side and being wound together into coils which extend substantially the length of the inductor and cooperating means for cooling said coils, said inductor being connected to non-conducting means extending substantially the length of the inductor whereby said apparatus is strengthened.

6. An induction heating apparatus comprising a source of two phase power an inductor formed from two co-axially wound coils, one phase of said two phase power source being connected to one of said coils, the other phase of said two phase power source being connected to the other coil, said coils extending side by side and being wound together into coils which extend substantially the length of the inductor and cooperating means for cooling said coils, said inductor being connected to non-conducting means extending substantially the length of the inductor whereby said apparatus is strengthened.

7. An induction heating apparatus comprising a source of two phase power an inductor formed from two co-axially wound coils, one phase of said two phase power source being connected to one of said coils, the other phase of said two phase power source being connected to the other coil, said coils extending side by side and being wound together into coils which extend substantially the length of the inductor, each of said coils having a bore extending throughout its length, and cooperating means connected to each of said coils for cooling said coils.

8. An induction heating apparatus comprising a source of two phase power an inductor formed from two coils, one phase of said two phase power source being connected to one of said coils, the other phase of said two phase power source being connected to the other coil, said coils extending side by side and being wound together into coils which extend substantially the length of the inductor, each of said coils having a bore extending throughout its length and cooperating means connected to each of said coils for cooling said coils.

References Cited in the file of this patent

UNITED STATES PATENTS

| Number | Name | Date |
|---|---|---|
| 1,791,934 | Northrup | Feb. 10, 1931 |
| 1,795,934 | Davis et al. | Mar. 10, 1931 |
| 2,132,875 | Myers | Oct. 11, 1938 |
| 2,297,878 | Denneen et al. | Oct. 6, 1942 |
| 2,325,810 | Strickland | Aug. 3, 1943 |
| 2,481,071 | Bowlus | Sept. 6, 1949 |
| 2,490,106 | Strickland | Dec. 6, 1949 |
| 2,497,516 | Phelps | Feb. 14, 1950 |
| 2,623,081 | Schong | Dec. 23, 1952 |